July 26, 1932.    J. KUHL    1,868,504
RELIEF VALVE
Original Filed Nov. 25, 1924
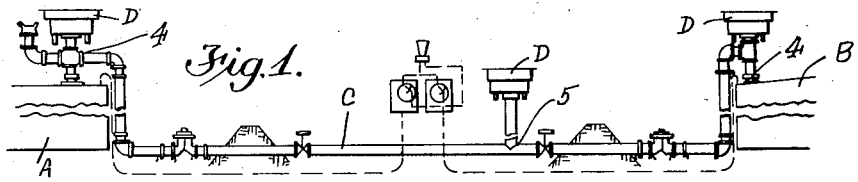
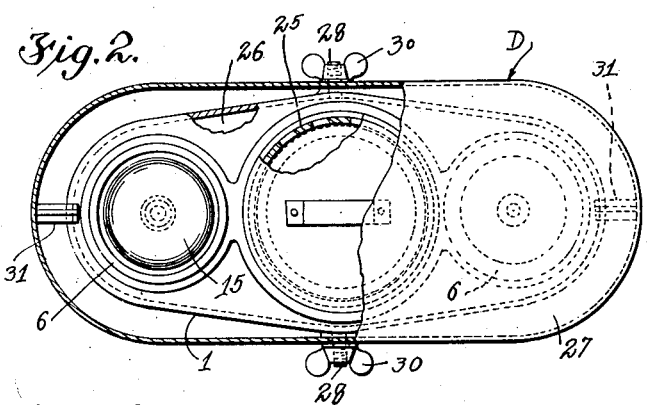
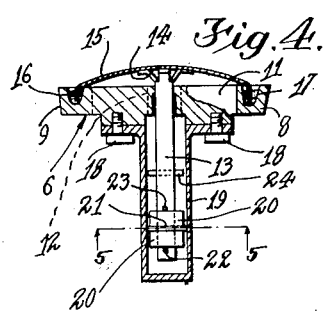
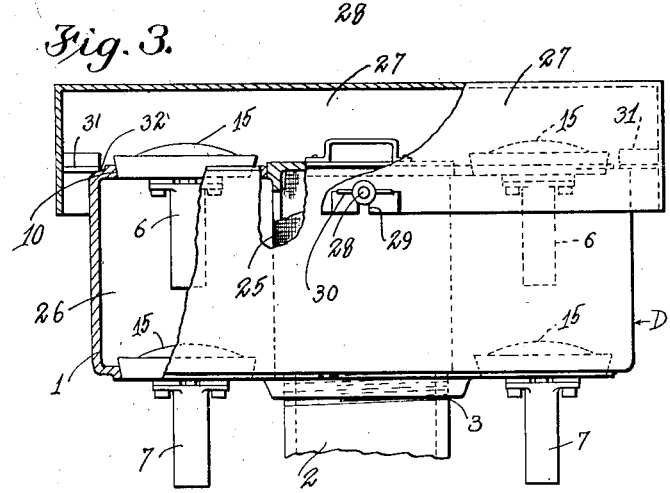
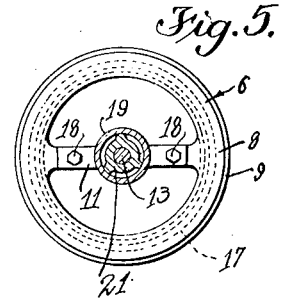
Inventor
John Kuhl
By Lyon & Lyon
Attorneys Patented July 26, 1932

1,868,504

UNITED STATES PATENT OFFICE

JOHN KUHL, OF OAKLAND, CALIFORNIA, ASSIGNOR TO STANDARD OIL COMPANY OF CALIFORNIA, OF SAN FRANCISCO, CALIFORNIA, A CORPORATION OF DELAWARE

RELIEF VALVE

Original application filed November 25, 1924, Serial No. 752,276. Divided and this application filed July 5, 1927. Serial No. 203,346.

This invention relates to relief valves, and is more particularly directed to vacuum and pressure relief valves for use in connection with containers of volatile fluids, particularly hydrocarbon oils. This application is a division of my copending application Serial No. 752,276, filed November 25, 1924, now Patent No. 1,637,489, for breather valve.

Large tanks, particularly as now employed for the storage of hydrocarbon oils, are not of such construction as to withstand much pressure change or pressure differential between the interior of the tank and the atmospheric pressure without the tank. Hydrocarbon oils as introduced into these tanks carry with them gas and the like, which develops considerable pressure differential with temperature changes as the vapors are evolved by heat. The pressure changes are particularly noticeable in gas-tight sealed roof types of oil storage tanks, which are now extensively employed. It is necessary for these large hydrocarbon oil storage tanks to provide means for venting the gas from the interior of the tanks as the pressure increases within the tank due to rise in temperature or other similar conditions, and also for allowing air or other gas to be admitted into the tank when the temperature falls within the tank, and produces a condition of reduced pressure. Under pumping conditions the differential pressure changes occur rapidly so that it is necessary also to provide means for rapidly venting the tanks to the atmosphere.

The relief valve produced in accordance with this invention is also susceptible to many other uses where sensitive valves are required such for example as to permit the drawing off of excess vapors from a storage tank or the like to a gasoline recovery plant.

The principal object of this invention is to provide a pressure or vacuum relief valve which is adapted to be mounted in a breather valve adapted for connection with hydrocarbon oil storage tank or the like, which is of such construction as to give a large amount of relief at low pressures and with a minimum possibility of valve sticking.

Another object of this invention is to provide a breather valve which includes pressure and vacuum relief valves adapted to operate at low vapor pressures within the hydrocarbon oil storage tank or the like, to give a large amount of relief, and which are constructed to include a light disc valve head adapted to seat within a liquid sealed seat, and the valve stem is mounted within a dash pot to prevent chattering and sticking of the light disc valve heads within the liquid sealed seat.

Other objects and advantages of this invention, it is believed, will be apparent from the following detailed description of a breather valve, including pressure and vacuum relief valves constructed to comprise light metal disc valve heads which are adapted to seat within a liquid sealed seat and which are provided with valve stems adapted to operate within dash pots, and as particularly adapted to hydrocarbon oil storage tanks as illustrated in the accompanying drawing.

In the drawing:

Figure 1 is a diagrammatic side elevation of a vapor line tank system illustrating the breather valve as embodying this invention included within this system.

Fig. 2 is a top plan view partly in section of a breather valve embodying this invention.

Fig. 3 is a side elevation thereof partly in section.

Fig. 4 is a sectional side elevation of one of the pressure or vacuum relief valves embodying this invention.

Fig. 5 is a sectional view taken substantially on the line 5—5 of Fig. 4.

In the preferred embodiment of this invention illustrated in the accompanying drawing, A and B illustrate hydrocarbon oil storage tanks which are connected together by means of a vapor line C. The vapor line C is connected with the tanks A and B in such manner that excess vapor pressure developed above the surface of the oil in the tank A during the filling of the tank A may be conveyed through the line C to the tank B which is being emptied. The vapor line system connecting the tanks A and B is specifically disclosed and illustrated in the patent issued to John M. Evans, dated January 4, 1927, No. 1,613,269.

Mounted in the vapor line C are a plurality of breather valves D. The breather valves D are preferably all of the same construction, and include a body 1 into which a nipple 2 is adapted to be screw threaded, as illustrated at 3. The nipple 3 is at its opposite end secured to the top of the tanks A and B, as illustrated at 4, or is secured directly to the vapor line C intermediate the tanks A and B, as illustrated at 5.

Mounted within the body 1 are pressure relief valves 6 and vacuum relief valves 7. Two pressure valves 6 and two vacuum relief valves 7 are illustrated as included in the body 1, but any desired number of such relief valves may be employed.

The pressure and vacuum relief valves 6 and 7 are preferably of substantially the same construction and preferably include insert seats 8 which are tapered on their periphery, as illustrated at 9, to fit within tapered bores 10 formed within the body 1. The seats 8 are preferably constructed as rings, which are reinforced by a transversely extending web 11. The web 11 terminates at the center of the ring in a cylindrical boss 12, through which a valve stem 13 extends. Secured to the upper end of the stem 13, as illustrated at 14, is a light metal disc 15 which is preferably of concavo-convex form and is provided at its periphery with a downwardly extending circumferential flange 16, which is adapted to fit within an annular recess 17 formed in the upper surface of the valve seat 8. The annular recess 17 is filled with a liquid, preferably mercury, or the like, to provide a liquid seal between the light metal disc 15 and the valve seat 8. Secured to the under surface of the web 11, as illustrated at 18, is a dash pot 19, into which the valve stem 13 projects. The dash pot 19 is preferably filled with a liquid, such, for example, as a light hydrocarbon oil.

Guide means are preferably provided for guiding the valve stem 13 in the dash pot 19 as the light metal disc 15 is raised from the valve seat 8 by the pressure changes occurring in either the tanks A or B, and which means are preferably of the following construction. Secured to the lower end of the valve stem 13 are a pair of cylindrical washers 20, between which a wing guide 21 is mounted. The washers 20 are properly housed in position by means of pins 22 and 23, which are passed through the valve stem 13 in position to engage the opposed ends of the washers 20.

In order to reduce the weight of the light metal disc 15 and valve stem 13 assembly so that it will be particularly sensitive to slight variations of pressure or vacuum within tanks A or B, the valve stem 13 is preferably formed as a hollow tube.

A stub pin 24 is placed through the valve stem 13 in position to engage the lower edge of the cylindrical boss 12 to prevent the light metal disc 15 from being displaced relative to the seat 8 when sudden pressure changes are developed in the tanks A or B.

The dash pot arrangement as above described serves as a lower guide for the valve stem 13 of the valves 6 and 7, and prevents the valves from chattering and thereby spilling the mercury from the annular recesses 16, and insures smooth operation of the valves 6 and 7 when opening or closing. The opening pressure of the valves 6 or 7 is determined only by the weight of the light metal disc 15 and its attached parts, and is not in any way dependent upon the depth of the sealed form by the mercury in the annular mercury recess 17.

In the form of breather valve illustrated in the accompanying drawing there is mounted a flash arrester 25, the construction of which is specifically disclosed in my co-pending application Serial No. 752,276, now Patent No. 1,637,489, for breather valves. The valves 6 and 7 are mounted in the body 1 within a pressure chamber 26, which is exterior to the flash arrester 25, so that when a reduced pressure or partial vacuum is created in the chamber 26 either by a drop in temperature of the contents within the tanks A or B or by the withdrawal of the hydrocarbon oil from the tanks A or B, the vacuum relief valve 7 opens to admit air or other gas into the tanks A or B. Likewise, when the temperature of the contents within the tanks A or B is increased, so as to increase the pressure within the tanks and, consequently, the vapor pressure within the chamber 26, or when the tanks A or B are being filled so as to increase the pressure within the chamber 26, the pressure relief valves 6 are opened so as to vent the vapor from the interior of the tanks A or B to the atmosphere.

In order to protect the pressure valve 6 and the entire breather valve construction from the elements, and from wind pressure and the like, the body 1 is provided with a cap 27 which is secured to the body 1 by threaded studs 28 which project through slots 29 formed in the lower edge of the cap 27 on which studs thumb-screws 30 may be placed. The cap 27 is maintained spaced from the body 1 by means of inwardly extending plates 31, which are secured to the inner periphery of the cap 27 in position to engage the body 1, as illustrated at 32.

Without the use of the dash pot 19, the mercury positioned within the annular recess 17 and providing the fluid seal between the light metal disc 15 and the seat 8, is quickly splashed away, on account of the chattering to which the very light weight valve disc 15 is subject, as differential pressure changes are created within the tanks A or B.

The tanks A and B such as are commonly employed for the storage of hydrocarbon oils are of such size as to make a relatively small change in pressure within the tanks extremely dangerous. This small pressure differential permissible within such tanks A and B in order to prevent the possibility of excessive strains on the tank structure, makes the use of extremely sensitive relief valves, such as are produced in accordance with this invention, imperative.

Having fully described my invention, it is to be understood that I do not wish to be limited to the details herein set forth, which may obviously be varied without departing from the spirit of my invention as defined by the appended claims.

I claim:

1. A relief valve adapted to be actuated by slight pressure variations, including a light valve head, a valve stem of light weight secured to and extending downwardly from the valve head, a dash pot surrounding the valve stem, guide means secured to the valve stem within the dash pot, the dash pot being filled with a liquid, an annular seat adapted to contain a sealing liquid to seal the relief valve in closed position, the valve head and stem being of relatively light weight and being operably connected with the dash pot, the valve head being held in sealing position in relation to the sealing liquid in the annular seat so as to permit relatively slight pressure variations to raise the valve head from the valve seat without causing chattering of the valve head against the seat or the valve stem within the dash pot.

2. A relief valve operable under slight pressure variations, including a valve head of relatively light weight provided with a substantially annular downwardly extending part adapted for seating in a liquid seal, a valve stem of relatively light weight secured to and extending downwardly from the valve head, a valve seat adapted to contain said liquid to form the liquid seal with the downwardly extending part of the valve head when the valve is closed, thereby permitting the valve head to be actuated on slight pressure variations to rise from the seat and break the liquid seal, and means cooperating with the valve stem to guide the valve head and to damp its motion slightly so as to prevent chattering of said valve head relative to the valve seat without interfering with the actuation of the valve head by slight pressure variations.

Signed at Oakland, California, this 22nd day of June, 1927.

JOHN KUHL.